United States Patent

Taplan et al.

[11] Patent Number: 5,958,272
[45] Date of Patent: Sep. 28, 1999

[54] COOKTOP WITH A GLASS OR GLASS CERAMIC COOKING SURFACE

[75] Inventors: Martin Taplan, Rheinbollen; Bernd Schultheis, Schwabenheim; Patrik Schober, Mainz-Mombach, all of Germany

[73] Assignee: Schott Glaswerke, Mainz, Germany

[21] Appl. No.: 08/823,209

[22] Filed: Mar. 24, 1997

[30] Foreign Application Priority Data

Mar. 29, 1996 [DE] Germany .............................. 196 12 621

[51] Int. Cl.⁶ ................................ H05B 3/68; H05B 1/02
[52] U.S. Cl. ............................................ 219/464; 219/518
[58] Field of Search .................................... 219/451, 452, 219/453, 458, 464, 465, 463, 367, 509, 518; 126/39 H, 39 J

[56] References Cited

U.S. PATENT DOCUMENTS

| 4,341,197 | 7/1982 | Butts | 219/453 |
|---|---|---|---|
| 4,960,978 | 10/1990 | Lorenz et al. | 219/465 |
| 5,097,113 | 3/1992 | Aoyama | 219/448 |
| 5,183,996 | 2/1993 | Hazan et al. | 219/464 |
| 5,357,079 | 10/1994 | Henry et al. | 219/453 |
| 5,432,320 | 7/1995 | Scheidler et al. | 219/464 |
| 5,679,273 | 10/1997 | Petetin | 219/468 |

Primary Examiner—Teresa Walberg
Assistant Examiner—Sam Paik
Attorney, Agent, or Firm—Kilpatrick Stockton LLP

[57] ABSTRACT

Cooktops with a glass or glass ceramic cooking surface include the usual multiple cooking zones and functional elements, like operating elements, display, etc. The cooking surface exhibits recesses, in which the operational zones, assigned to the elements, are mounted flush with the cooking surface. The operational zones are formed preferably by a glass or glass ceramic part, which is embedded in the cooking surface by means of a temperature stable, sealing connection. The cooking surface exhibits operational zones in the form of weighing, display and operating element zones.

19 Claims, 3 Drawing Sheets

COOKTOP WITH A GLASS OR GLASS CERAMIC COOKING SURFACE

FIELD OF THE INVENTION

The invention relates to a cooktop with a glass or glass ceramic cooking surface with at least one cooking zone, and with at least one functional element, such as an operating or display element, to which a defined operational zone is assigned in the cooking surface, and said operational zone is mounted flush with said cooking surface in a recess.

Such a cooktop is known as discussed in DE 42 35 263 C2.

BACKGROUND OF THE INVENTION

The function of commercially available glass or glass ceramic cooktops for cooking wells or stoves is limited predominantly to heating and keeping warm the food to be cooked. The cooking zones are controlled with energy regulators which are operated as automatic regulators with optional temperature or time control. Furthermore, the cooking zones are equipped with induction loops for automatic pot detection or pot size detection in the case of multicircuit heaters.

Cooktop also exist in which functional elements, such as operating and display elements, are integrated into the cooking surface. Thus the aforementioned document includes a functional element in the form of a manual switch installed in an opening in the cooking surface. The opening is sealed with a permanently elastic silicone adhesive in the manner of a diaphragm, flush with the surface of the cooktop. This defines an operational zone. This operational zone sealed with silicone has the requisite is sufficiently flexible so that the switch mounted below is manually operable.

Conventionally, the operational zone is made of a material which is different from that of the cooking surface. Therefore, the operational zone is in sharp visual contrast with the cooking surface, a feature that can have a negative effect on the overall appearance of the appliance. Furthermore, in the known case, only recesses of the cooking surface with a small dimension can be bridged, i.e. the integration of functional elements is limited with respect to the choice of type. Therefore, functions and processes related to the cooking operation have to be done separately by the operating personnel. In particular, the weighing of food has to be done on a separate scale. Similarly, cooking recipes have to be found in a cook book. This means more time and space is needed in the kitchen.

Therefore, the present invention is based on the problem of integrating functions and processes accompanying the cooking process, such as control and weighing functions and recipe display, into the cooktop with an visually appealing look without spatially limiting the operational zone.

This problem is solved by the invention in that the operational zone is formed by a part that is made of a hard material and that is embedded into the recess of the cooking surface by means of a thermally stable sealing connection that compensates for the different coefficients of thermal expansion.

SUMMARY OF THE INVENTION

The invention enables the construction of operational zones having large areas. Therefore, the invention makes it possible to construct operational zones for different functions and processes. Since a material is used for the operational zone that is the same as the material of the cooking surface, or very similar to it, should a glass material be used, it is possible to achieve a visually attractive look.

Depending on the planned use, the part that forms a respective operational zone can be mounted rigidly or flexibly, relative to the movements perpendicular to the cooking surface, in the recess. In the case of a rigid mounting, the operational zone is assigned display functions, (e.g. the indication of recipes), thus forming a display. In the case of a flexible mounting, the operational zone can be assigned to functions, which can be activated as a function of the path, e.g. weighing or switching functions.

According to another embodiment of the invention, a functional element (which responds to the mass of the cooking device that may or may not contain food to be cooked and that is placed on the weighing zone) is assigned to the operational zone when the operational zone is designed as a weighing zone. In this case, the operational zone is also suitable for generating signals for automated cooking processes.

According to another embodiment of the invention, the operational zone can be integrated into the cooking zone. Then the function concerned, e.g. the weighing function, can be activated during the cooking process, e.g. as the pot detection system.

To provide a display zone according to another aspect of the invention, an electronically driven display unit is provided. In this case, the embedded part of the operational zone is made preferably of transparent glass.

When the operational zone is defined as an operating element zone (i.e., a heating control switch), suitable operating elements for controlling the supply of heating energy to the individual cooking surfaces are assigned to it.

Preferably all of the operational zones of the various types are combined in a defined operational region of the cooking surface. At the same time, it is conceivable to design the operational region as a closed module, exhibiting non-destructively detachable mechanical connectors for the purpose of its separate replacement. In this manner, the cooktop can be repaired in the field at a low cost when the operational region is defective.

For the design of the functional elements assigned to the individual operational zones, such as switching elements, weight sensors, display units, etc., the expert has available to him a number of components, which he will select depending on the application, adapted to the respective conditions.

Other designs of the invention and specific advantages follow with the aid of the description from the embodiments shown in the drawings.

DETAILED DESCRIPTION OF THE PREFERRED EMBODIMENTS

Figure 1:
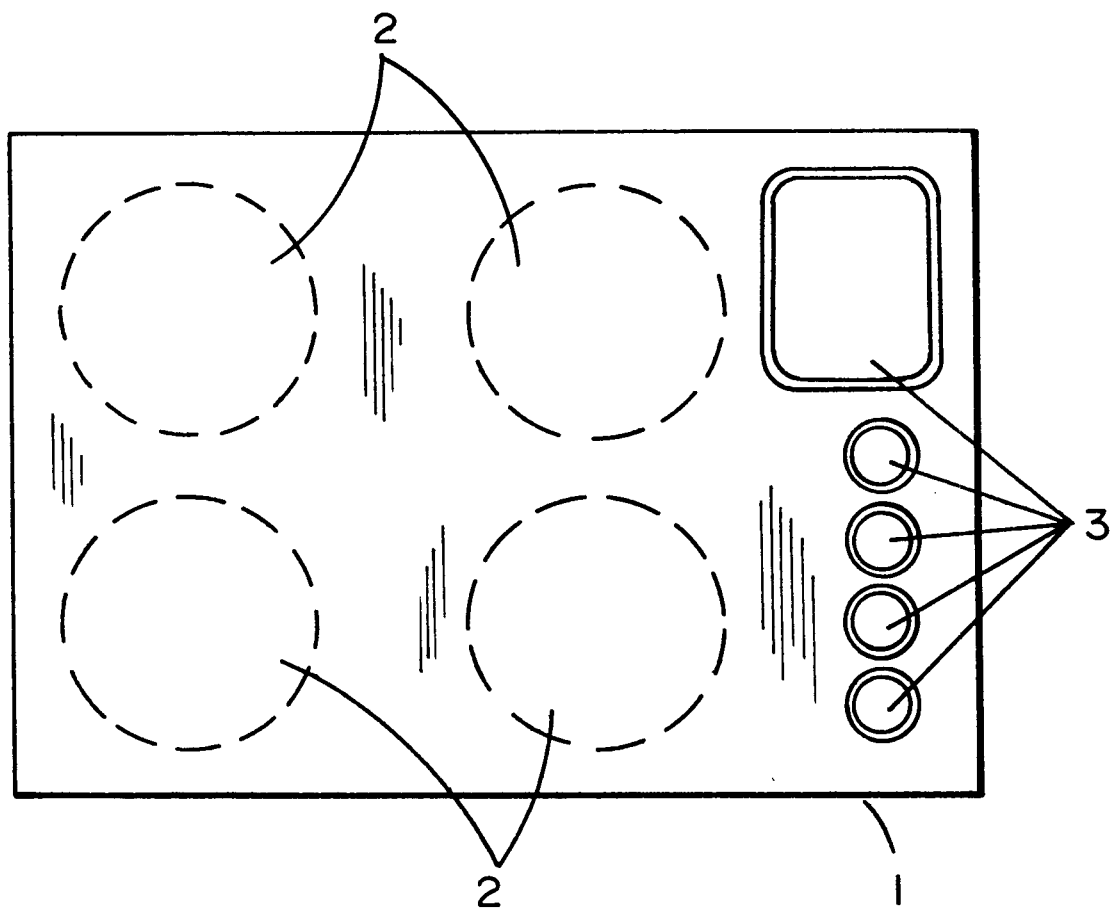
FIG. 1 is a diagrammatic top view of a cooking surface provided with a plurality of operational zones according to the invention.

FIG. 1 is a diagrammatic top view of a cooktop with a cooking surface 1, which is made of, for example, glass or glass ceramic and has, for example, four cooking zones 2. The particular number of cooking zones shown serves merely as an example. The cooking surface can have an arbitrary number of cooking zones of conventional design.

The right side of the cooking surface 1 shows examples of embedded operational zones 3, which shall be explained below. The spatial arrangement of the operational zones 3 in the design according to FIG. 1 serves merely as an example. The operational zones 3 can also be concentrated in one operational region in accordance with the German patent cited above. However, they can also be distributed over the entire cooking surface.

A functional element (not illustrated) in the cooktop 1 is provided in a respective one of the operational zones 3. The zones 3 are formed by, for example, a glass or glass ceramic part, which is mounted, i.e. embedded, flush with the cooking surface 1 by means of a thermally stable, sealing and permanently elastic connection in a recess in the cooking surface 1. In this manner, generally, the operational zones 3 shown as a diagram in FIG. 1 are defined.

Figure 2:
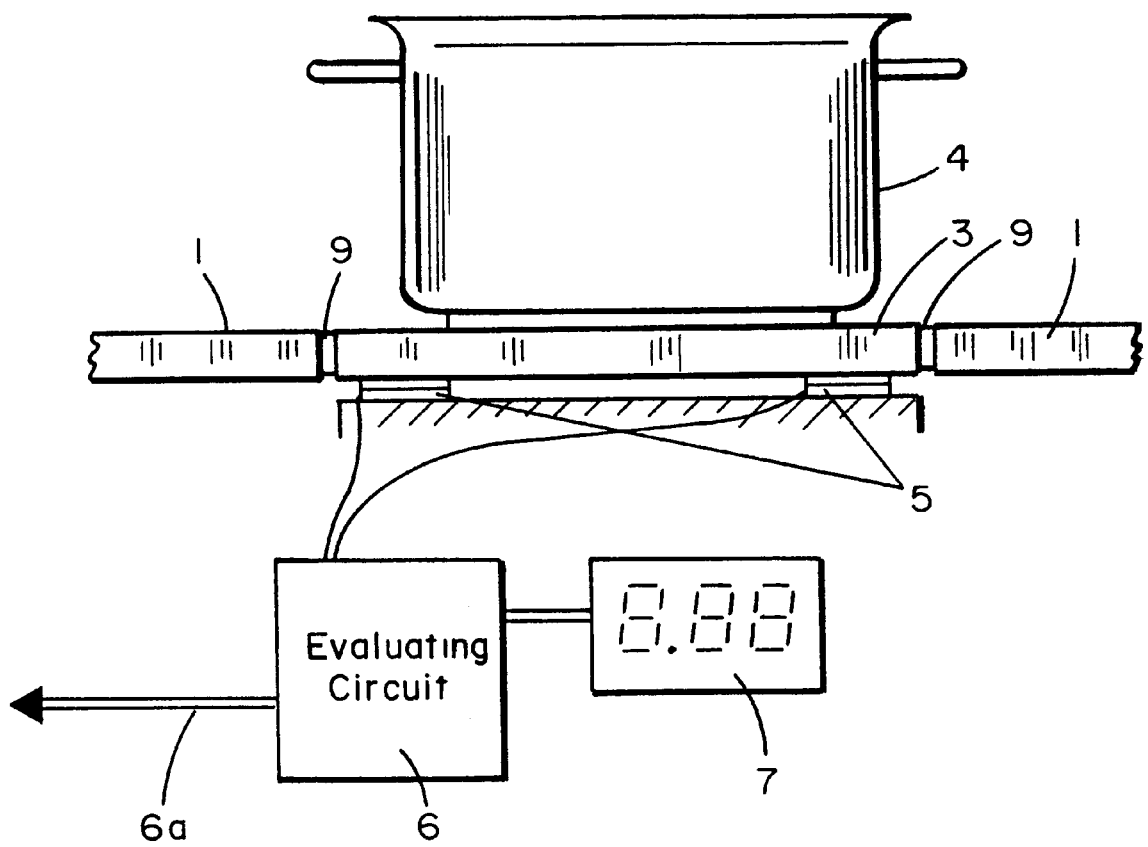
FIG. 2 is a cross section of the cooking surface 1 along one of the operational zones which, in this case, is a weighing zone.

FIG. 2 is of a cross section of an aspect of the invention, in which the operational zone 3 is, for example, as a weighing zone, i.e. as part of a scale. A large operational zone 3 is embedded in the cooking surface 1 by mounting a correspondingly large glass or glass ceramic part into a suitable recess in the cooking surface 1 by means of a flexible connection 9, elastically yielding with respect to forces (e.g. weight) perpendicular to the cooking surface 1. This operational zone is designed in such a manner with respect to its dimensions that pots 4 or pans can be set thereupon so as to conform with the surface. Below this flexibly yielding area on which pots and pans may be set, there are, for example, piezoelectric sensors 5, which pass voltage signals to an evaluating circuit 6 as a function of the mechanical pressure. The mass of pot 4 standing on the weighing zone 3, with or without food to be cooked therein, is indicated to the user by a suitable display unit 7. This display is done preferably in an operational zone according to FIG. 3.

Instead of piezoelectric sensors, other suitable pressure gauges, for example capacitive pressure gauges, can be used, provided their materials are suitable for the environmental conditions of the cooktop, especially heat.

Other examples are optical or acoustical or inductive displacement gauges, which detect the different mismatch as a function of weight between the weighing zone 3 and the surrounding cooking surface 1.

The operational zone scale as described here can also be integrated into the cooking zone, and thus can be used as a pot detecting system. Then the environment 1 of the operational zone 3 in FIG. 3 must be regarded as part of the cooking zone 2.

The scale for determining the actual amount of food to be prepared is also mandatory for the exact control of an automatic cooking process. An evaluating circuit 6, such as a microprocessor, automatically computes the cooking parameters for the desired menu, in this case as a function of the weighed quantity of food to be cooked. The circuit then adjusts the cooking process parameters by means of the output 6a, as seen in FIG. 2.

The process enables very high accuracy in the cooking process.

By integrating the weighing function into the cooking plane the advantages of easy cleaning and the continuous working surface are also retained. These features are especially important for the aesthetics of the cooktop.

Figure 3:
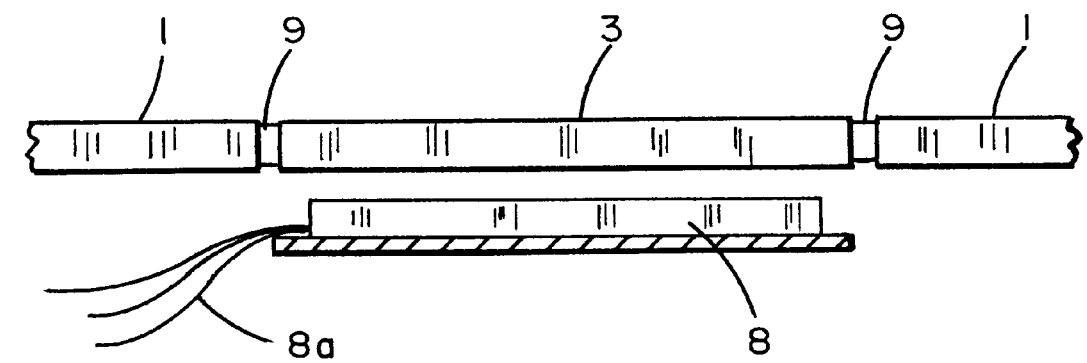
FIG. 3 is a cross section of the cooking surface along one of the operational zones which, in this case, is a display zone.

FIG. 3 is a diagrammatic sectional view of another aspect of the invention, where the operational zone 3 is, in this instance, an indicating zone, i.e. forming a display. An operational zone 3, including a suitably large area, is embedded into the cooking surface 1, by mounting a correspondingly large glass or glass ceramic part in a corresponding recess in the cooking surface by means of a rigid connection 9, relative to movement perpendicular to the cooking surface. Below the part defining the operational zone 3 there is mounted a conventional electronic video display unit 8, which can be driven by means of connectors 8a with electric signals, e.g. from evaluating circuit 6 seen in FIG. 2.

When the menu function is activated, this display unit can show, for example, recipes, so that the operating person is guided by the menu display when preparing the recipes. In particular the menu can be displayed precisely in connection with an integrated scale according to FIG. 2.

Especially advantageous for the display unit 8 are large area LCD or plasma fluorescent displays. In this respect the operational zone 3 is made in the preferred embodiment of a transparent non-dyed glass or plastic (preferably: temperature shock resistant glass or transparent glass ceramic).

Figure 4:
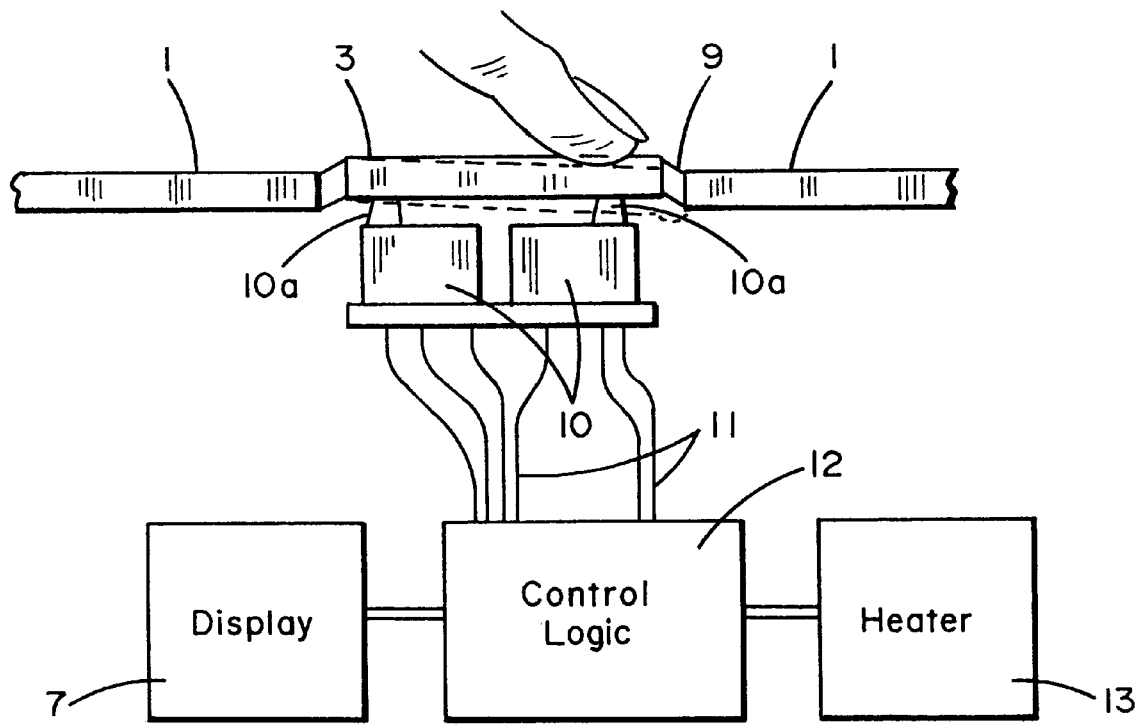
FIG. 4 is a cross section of the cooking surface along an operational zone designed as one of the operating which, in this case, is an operating element zone.

FIG. 4 is a diagrammatic sectional view of another aspect of the invention, where the operational zone 3 of FIG. 1 is, in this case an "operating element" for controlling the supply of heat energy to the individual cooking zones. Cooking surface 1 has a circular borehole, into which a disk, forming the operational zone 3, is cemented by means of a flexible silicone rubber 9, thereby being elastically yielding with respect to the movements perpendicular to the cooking surface (such as finger tip pressure). Below the disk there is a microswitch 10 with contacts 10a. By gently pressing with the fingers from the top the contacts 10a are closed, i.e. the disk forming the operational zone 3 serves as a rocker switch. When the microswitch contacts 10a are activated, they send a suitable signal over a lead 11 to a control logic 12. Said control logic controls the energy of a connected heater 13 for the cooking zones 2 and it is visually signaled at a suitable display unit 7 (e.g. 7-segment display, light emitting diodes, light emitting diode chain, symbol or alternating symbol displays, . . . ) (see FIG. 5).

The disk of the operational zone 3 can be made not only of glass ceramic like the cooking surface but also of another material (metal, plastic, glass, ceramic,. . . ). With respect to appearance considerations, the glass ceramic design is preferred.

Figure 5:
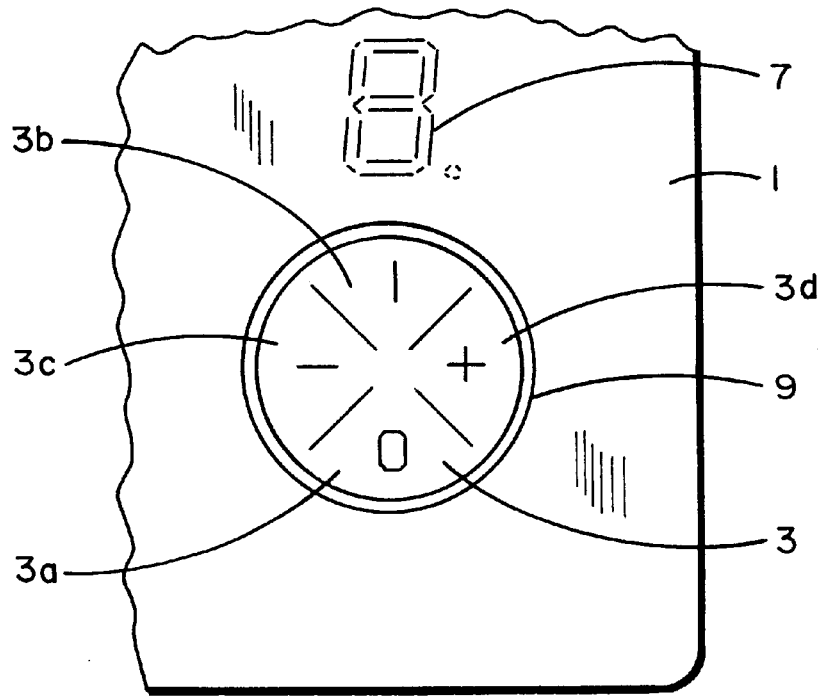
FIG. 5 is a top view of the operational zone shown in FIG. 4.

FIG. 5 is a top view of the operational zone 3 of FIG. 4. The circular operational zone 3 is divided into, for example, four segments 3a–3d, where the quadrants 3a and 3b are intended for switching on and off, respectively; and the quadrants 3c and 3d, for controlling the amount of heat energy of the corresponding cooking zone. The related display element 7 is located under the glass ceramic plate of the cooking surface 1.

The scale according to FIG. 2 and rocker switch according to FIGS. 4 and 5 are embedded, relative to the movements perpendicular to the cooking surface, flexibly (and, in the case of a display, rigidly) into the cooking surface 1. The connection can be achieved either by cementing or snapping in (for a rigid mounting: plastic, metal; for a flexible mounting: rubber, silicone rubber). The connection between the operational zone and the glass ceramic is designed to be temperature stable (hot pot) and sealed with respect to overflowing food or liquid. Furthermore, the connecting material has to be permanently elastic, depending on the requirement; in particular the different coefficients of thermal expansion must be observed and accounted for.

The illustrated operational zones are only examples. Other functions can also be integrated into the cooking surface using a corresponding structive and construction.

We claim:

1. A cooktop with a glass or glass ceramic cooking surface, which includes at least one cooking zone, and with at least one functional element, such as an operating or display element, to which a defined operational zone is assigned in the cooking surface, and said operational zone is mounted flush with said cooking surface in a recess, wherein
   the operational zone is formed by a part that is made of a hard material and that is embedded into the recess of the cooking surface by means of a thermally stable, sealing connection that compensates for the different coefficients of thermal expansion; and
   wherein the glass or glass ceramic part that forms the operational zone is mounted flexibly, relative to the movements perpendicular to the cooking surface, in the recess of the cooking surface by means of a permanently elastic connection; and
   the operational zone includes a weighing zone element that responds to the mass of the cooking device that may or may not contain food to be cooked and that is put on the weighing zone.

2. A cooktop, as claimed in claim 1, wherein the glass or glass ceramic part is mounted flexibly with adhesive in the recess of the cooking surface, by means of a permanently elastic rubber, preferably a silicone rubber.

3. A cooktop, as claimed in claim 1, wherein the operational zone is integrated into at least one cooking zone.

4. A cooktop, as claimed in claim 1, wherein to design the operational zone is designed as a display zone and an electronically driven display unit is assigned to the operational zone.

5. A cooktop, as claimed in claim 4, wherein a large area LCD or plasma fluorescent display is provided as the display unit.

6. A cooktop, as claimed in claim 1, wherein the operational zone as an operating element zone, operating elements for controlling the supply of energy to the individual cooking zones are assigned to said operational zone.

7. A cooktop, as claimed in claim 6, wherein the operational zone, designed as the operating element, contains microswitches, designed as multifunctional switches, wherein regions of the switch are assigned to the on/off switching process and other regions are assigned to adjusting the supply of energy to the individual cooking zones.

8. A cooktop, as claimed in claim 1, wherein all of the operational zones are combined in a defined operational region of the cooking surface.

9. A cooktop, as claimed in claim 1, wherein the functional elements of the weighing zone are formed by sensors, followed by a signal evaluating circuit, which sends the signals to a display unit and/or drives a step for setting the cooking parameters (cooking time, cooking zone temperature).

10. A cooktop with a glass or glass ceramic cooking surface, the cooktop comprising at least one cooking zone, and at least one functional element, such as an operating or display element, to which a defined operational zone is assigned in the cooking surface, and said operational zone is mounted flush with said cooking surface in a recess, wherein the operational zone is formed by a part that is made of a hard material and that is embedded into the recess of the cooking surface by means of a thermally stable, sealing connection that compensates for the different coefficients of thermal expansion; and wherein the operational zone includes a weighing zone, a functional element that responds to the mass of the cooking device that may or may not contain food to be cooked and that is put on the weighing zone, is assigned to the operational zone.

11. A cooktop, as claimed in claim 10, wherein the glass or glass ceramic part that forms the operational zone is mounted rigidly, relative to the movements perpendicular to the cooking surface, in the recess of the cooking surface.

12. A cooktop, as claimed in claim 11, wherein the glass or glass ceramic part is mounted by means of a plastic or metal clip in the recess of the cooking surface.

13. A cooktop, as claimed in claim 10, wherein the glass or glass ceramic part that forms the operational zone is mounted flexibly, relative to the movements perpendicular to the cooking surface, in the recess of the cooking surface by means of a permanently elastic connection.

14. A cooktop, as claimed in claim 13, wherein the glass or glass ceramic part is mounted flexibly with adhesive in the recess of the cooking surface, by means of a permanently elastic rubber, preferably a silicone rubber.

15. A cooktop as claimed in claim 10, wherein the operational zone is integrated into at least one cooking zone.

16. A cooktop as claimed in claim 10, wherein the operational zone is designed as a display zone that includes an electronically driven display unit.

17. A cooktop as claimed in claim 10, wherein the operational zone is designed as an operating element zone, which includes operating elements for controlling the supply of energy to the individual cooking zones are assigned to said operational zone.

18. A cooktop as claimed in claim 10, wherein all of the operational zones are combined in a defined operational region of the cooking surface.

19. A cooktop as claimed in claim 10, wherein the functional elements of the weighing zone are formed by sensors, followed by a signal evaluating circuit, which sends the signals to a display unit and/or drives a step for setting the cooking parameters (cooking time, cooking zone temperature).

* * * * *